(12) United States Patent
Maetschke

(10) Patent No.: US 6,484,122 B1
(45) Date of Patent: Nov. 19, 2002

(54) SYSTEM AND METHOD FOR EVALUATING CHARACTERISTICS FOR SUITABILITY IN CLASSIFICATION

(75) Inventor: Stefan Maetschke, Unterrieden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/571,240

(22) Filed: May 16, 2000

(51) Int. Cl.$^7$ .................................................. G06F 5/00
(52) U.S. Cl. ........................... 702/179; 702/22; 702/85; 702/189
(58) Field of Search ............................. 395/500; 702/22, 702/85, 179, 189, 81, 82, 83, 84; 382/128; 705/7; 707/1; 435/183

(56) References Cited

U.S. PATENT DOCUMENTS

| 5,555,406 | A | * | 9/1996 | Nozawa ........................ 395/500 |
| 5,715,327 | A | * | 2/1998 | Wilhelm et al. ............. 382/128 |
| 5,987,398 | A | * | 11/1999 | Halverson et al. .......... 702/179 |
| 6,253,159 | B1 | * | 6/2001 | Bett et al. ...................... 702/85 |
| 6,269,313 | B1 | * | 7/2001 | Givens et al. ................. 702/22 |

OTHER PUBLICATIONS

Wolfgang Abmayr, Einführung in die digitale Bildverarbeitung, 1994, pp. 223–233 and 272–275.

* cited by examiner

*Primary Examiner*—Marc S. Hoff
*Assistant Examiner*—Felix Suarez
(74) *Attorney, Agent, or Firm*—Foley & Lardner

(57) ABSTRACT

A system and method evaluates a characteristic for suitability in classification of subjects. The system generates subject data including characteristic data and class data. The method includes arranging the subject data based on the characteristic data, and identifying the number of class changes from one class to another class in the arranged subject data. The number of class changes represents the suitability of the characteristic for classification of the subjects. The method further includes measuring the interval between class changes in the arranged subject data. The interval between class changes also represents the suitability of the characteristic for classification of the subjects.

33 Claims, 4 Drawing Sheets

SYSTEM AND METHOD FOR EVALUATING CHARACTERISTICS FOR SUITABILITY IN CLASSIFICATION

FIELD OF THE INVENTION

The present invention relates generally to the field of signal processing. More specifically, the present invention relates to signal processing a characteristic signal of a subject.

BACKGROUND OF THE INVENTION

In industrial automation, signal processing is used to classify an object being manufactured or processed based on a characteristic of the object. For example, an apple might be classified by a weight sensor configured to sense the weight of the apple. If the weight is greater than a predetermined weight, the apple is identified as "good", and, if not, the apple is identified as "bad".

However, the object can also be classified by other signals. For example, the apple might also be classified by acquiring a color digital image of the apple. If the apple is darker than a predetermined gray scale, or if the apple lacks sufficient red color, the apple is identified as "bad". The challenge is to determine which characteristic (e.g., weight, color, gray scale, etc.) best classifies the objects into the desired classifications, so that the best characteristic can be used during production to automatically classify objects.

A standard method for evaluating the classification of objects has been implemented which assumes a bimodal distribution of the measured characteristic, the distributions assumed to be Gaussian. For example, referring to FIG. 1, this standard method generates a histogram 9 of the frequency of occurrence of different values of the characteristic. The x-axis represents the values of the characteristic (e.g., weight, color, etc.) and the y-axis represents the frequency of objects having that characteristic. A first mode 11 includes objects in a first class (e.g., "bad" objects) and a second mode 13 includes objects in a second class (e.g., "good" objects). According to this method, the mean values 17, 15 of each mode are identified, the variances of mean values 17, 15 are determined, and the distance 19 between mean values 17 and 15 is determined. The smaller the variances and the greater the interval between mean values 17, 15, the greater is the quality of the characteristic for classification of this object.

One drawback of this method is that characteristic distributions frequently are neither bimodal nor Gaussian and, thus, are incorrectly evaluated by this prior method. With reference to FIG. 2, a frequency distribution 21 of another characteristic is shown, in which mode 23 is not Gaussian. Further, mode 23 includes objects in a first class, mode 24 includes objects in a second class, and mode 26 includes additional objects in the first class. An example of such a distribution might be one in which the characteristic is the length of a wooden dowel, wherein "good" dowels must have a length within a certain tolerance. Thus, "bad" dowels have lengths greater than (mode 26) and less than (mode 23) "good" dowels (mode 24). Prior methods will not adequately evaluate the suitability of this characteristic for classification purposes, since the distribution in FIG. 2 is not Gaussian and not bimodal.

Accordingly, there is a need for a system and method for evaluating the suitability of characteristics for classification. There is further a need for such a system and method which is applicable to non-Gaussian distributions. Further still, there is a need for such a system and method which is applicable to non-bimodal distributions. There is also a need for such a system and method which is robust against noise.

SUMMARY OF THE INVENTION

According to an exemplary embodiment, a method of evaluating a characteristic for suitability in classification of subjects based on subject data is provided. The subject data includes characteristic data and class data. The method includes arranging the subject data based on the characteristic data, and identifying the number of class changes from one class to another class in the arranged subject data. The number of class changes represents the suitability of the characteristic for classification of the subjects.

According to an alternative embodiment, a method of evaluating a characteristic for suitability in classification of subjects based on subject data is provided. The subject data includes characteristic data and class data. The method includes arranging the subject data based on the characteristic data, identifying consecutive subject data having a class change, and measuring the interval between the two consecutive subject data. The interval between class changes represents the suitability of the characteristic for classification of the subject.

According to yet another alternative embodiment, a system for evaluating a characteristic for suitability in classification of subjects is provided. The system includes sensing means for acquiring characteristic data from a plurality of subjects and classification means for classifying each subject with one of a first class and a second class. The system further includes means for arranging the subject data based on the characteristic data and identifying the number of class changes from one class to another class in the arranged subject data. The number of class changes represents the suitability of the characteristic for classification of the subjects.

BRIEF DESCRIPTION OF THE DRAWINGS

The invention will become more fully understood from the following detailed description, taken in conjunction with the accompanying drawings, wherein like reference numerals refer to like elements, and in which.

DETAILED DESCRIPTION OF THE PREFERRED EMBODIMENTS

Figure 1:
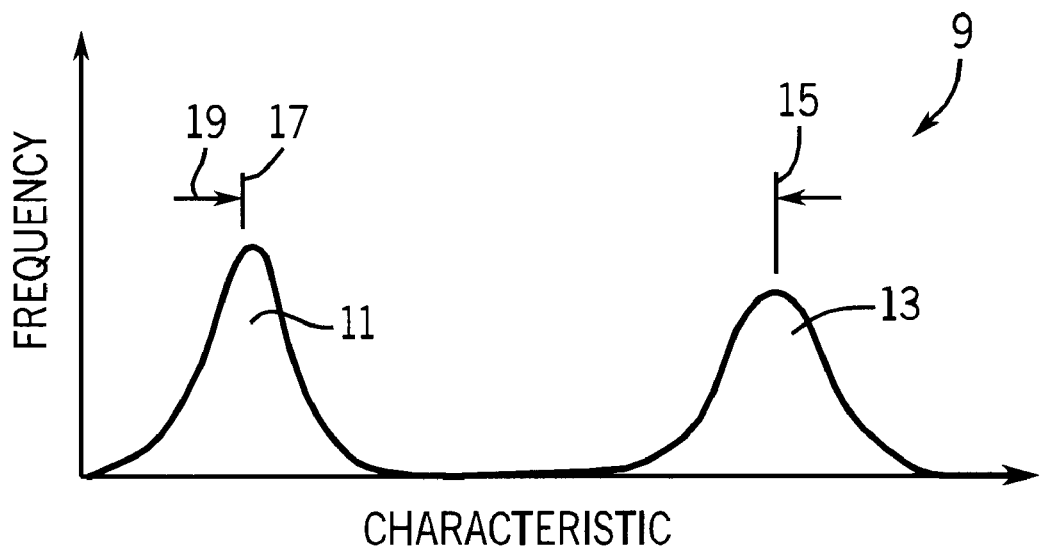
FIG. 1 is a histogram of a bimodal, Gaussian frequency distribution of a characteristic.
Figure 2:
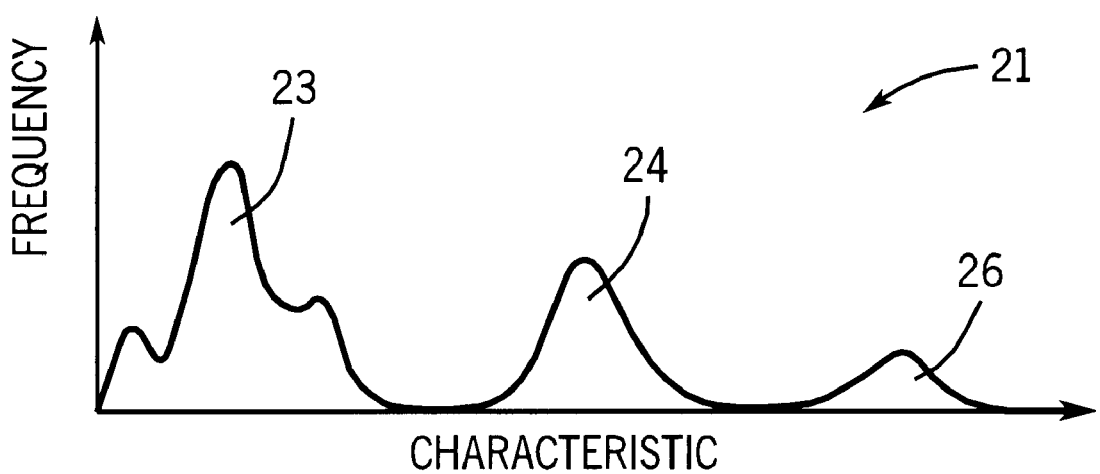
FIG. 2 is a histogram of a non-bimodal, non-Gaussian frequency distribution of a characteristic.
Figure 3:
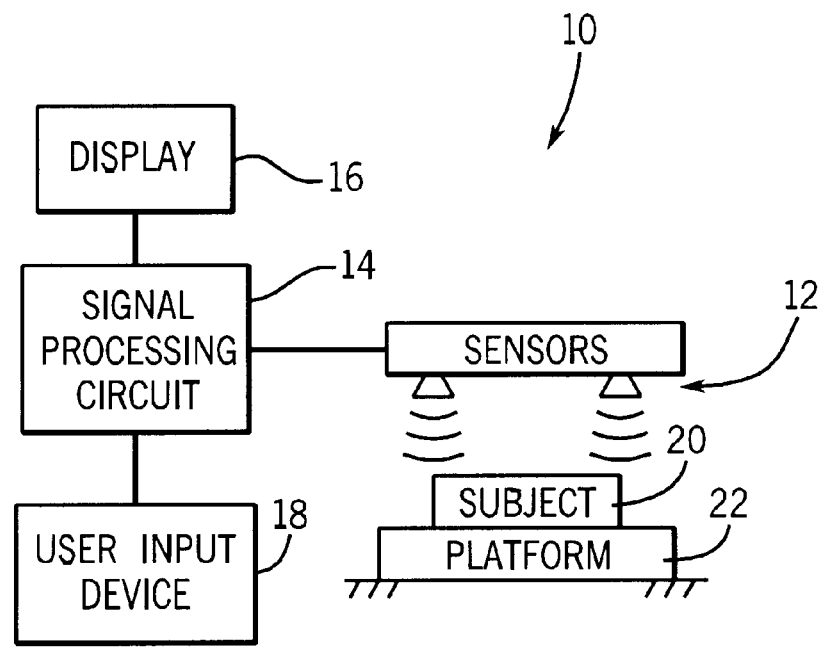
FIG. 3 is a block diagram of a system for evaluating a characteristic for suitability in classification of objects, according to an exemplary embodiment.

Referring first to FIG. 3, a block diagram of an exemplary system is shown. System 10 includes a plurality of sensors 12 and a signal processing circuit 14, and, optionally, a display 16 and user input device 18. System 10 acquires characteristic data sets (e.g., an image data set, a sound data set, other one-dimensional or multi-dimensional signal data sets, etc.) of a subject 20 (e.g., an object such as a welding spot, a tile, a motor, etc.) on a conveyor belt or platform 22. System 10 may be implemented on a multisignal processing system, such as, SIMULTAN, manufactured by Siemens AG, Munich, Germany. The SIMULTAN system can generate many different characteristic data sets regarding a subject and can process a wide variety of signal types such as, images, sounds, vibration, current, force, etc. Thus, the system and method described below selects the best characteristic or characteristics to use for each classification purpose.

Sensors 12 (e.g., video cameras, ultrasonic transducers, infrared sensors, microphones, etc.) are configured to acquire characteristic data, for example, in the form of a digital image of subject 20 against a background or platform 22. In this example, a video camera is configured to acquire an image data set in gray scale and to transmit the image data set to signal processing circuit 14. Alternatively, the video camera may acquire characteristic data in color and transmit separate subject data sets for red, green, and blue for each image. Alternatively, only one sensor may be available, though multiple sets of characteristic data may be generated or calculated from the output of the one sensor.

Signal processing circuit 14 (i.e., a computer) includes a programmed microprocessor (e.g., an INTEL x86 processor, microcontroller, etc.), memory, communication interfaces, etc. Alternatively, signal processing circuit 14 may comprise programmable logic, discrete circuit components, etc. Circuit 14 operates according to a software or hardware program stored in memory (e.g., hard disk storage, firmware, non-volatile memory, etc.), is configured to perform various signal processing functions on the received characteristic data sets, and may further be configured to provide display signals to display 16 (e.g., a cathode ray tube, liquid crystal display, etc.) and receive user input from user input device 18 (e.g., a keyboard, touchscreen, etc.).

Figure 4:
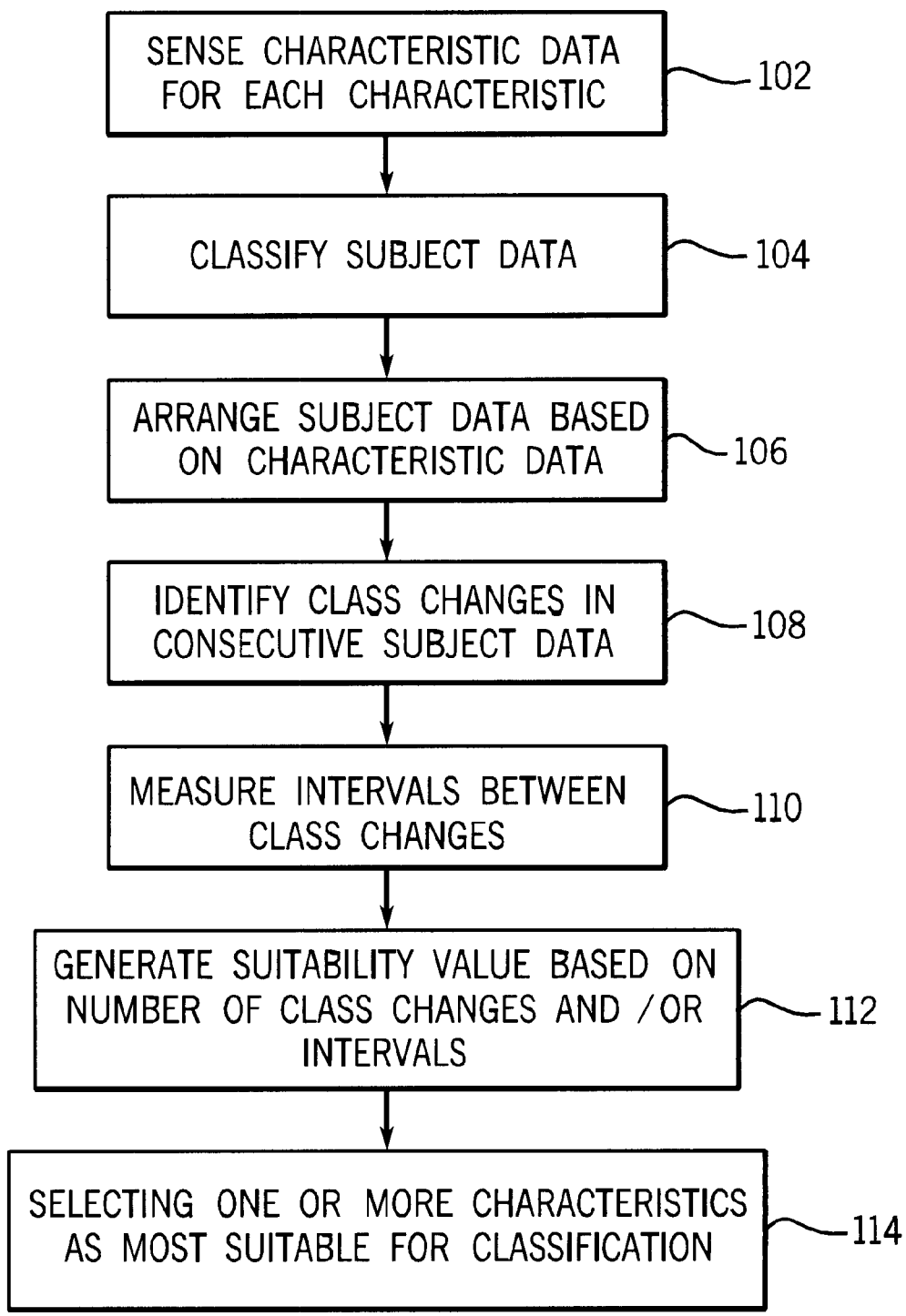
FIG. 4 is a flow diagram showing steps in a method according to an exemplary embodiment.

Referring now to FIG. 4, steps performed by circuit 14 will be described. At step 102, system 10 is configured to sense, via sensors 12, characteristic data regarding subject 20. According to one example, a user places subject 20 (e.g., a metal part having a spot weld) on platform 22 and presses a switch (e.g., button, mouse click, touch screen, etc.) on user input device 18. In response, signal processing circuit 14 commands sensors 12 to sense one or more characteristics of subject 20. For example, one of sensors 12 might be a video camera configured to obtain a digital image of subject 20. Another of sensors 12 might be a weight sensor configured to weigh subject 20. Yet another of sensors 12 might be a length sensor configured to measure a diameter of subject 20. Any type of sensor for measuring any characteristic about a subject 20 is contemplated. When the one or more characteristic data sets of subject 20 are acquired, they are transmitted to signal processing circuit 14 which stores the characteristic data in a data structure in memory for further processing. The data structure includes both characteristic data and any other subject data, such as class data (see step 104 below). The user typically processes a number of subjects (e.g., 10, 20–30, etc.) to acquire a statistically significant sampling of the various classes of subjects.

At step 104, the subject data is classified into one of a number of classes. In this exemplary embodiment, the subject data is classified into a "good" class and a "bad" class. Alternatively, subject data can be classified into classes representing various sizes (e.g., short, medium, long), qualities, features, etc. One method of classifying subject data is for a user to press a switch on user input device 18 to indicate whether the subject currently on platform 22 is good or bad. A user puts a plurality of subjects on platform 22 and, for each subject, acquires characteristic data, and associates a class (e.g., good spot weld, bad spot weld, etc.) with each subject to generate the class data. Circuit 14 is configured to store the subject data, having the characteristic data and the class data, in a memory in preparation for further processing.

Figure 5:
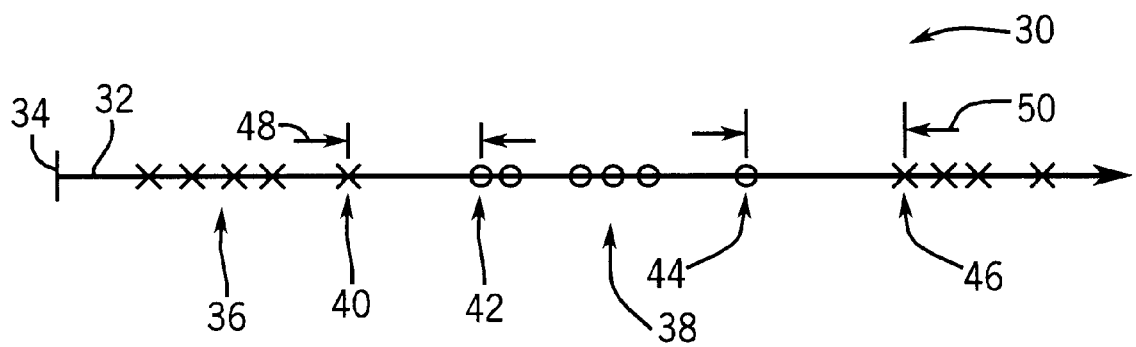
FIG. 5 is a number ray according to an exemplary embodiment.

At step 106, circuit 14 is configured to begin processing of the subject data. Circuit 14 first arranges the subject data based on the values of the characteristic data. More specifically, the characteristic data typically assumes values over a range of values from a minimum to a maximum (e.g., from a deep red color to a deep blue color, from a minimum weight of zero to a maximum weight of perhaps 2–3 kilograms, etc.). As a graphical representation of the result of this arrangement, a number ray 30 is shown in FIG. 5. Number ray 30 includes a line 32 extending outward from a minimum characteristic value 34. Each of the subject data is plotted on number ray 30, such as is shown at points "X" 36 and "O". The "X" and "O" indicia represent the class data for each data point (e.g., class X, class O), as generated at step 104. The number ray is merely a representation of the arrangement; typically, in an actual embodiment, circuit 14 is configured to store the subject data in a linear data structure or in consecutive memory locations to form the arrangement. Alternative arrangement methods are contemplated.

At step 108, circuit 14 is configured to identify the number of class changes from one class to another in the arranged subject data. Referring again to FIG. 5, circuit 14 is configured to read the class data from each subject data, proceeding from point 34 along line 32 on number ray 30. At point 40, a class "X" is read. The next consecutive or neighboring point along line 32, point 42, indicates a class "O", i.e., a change in class from class X to class O. Circuit 14 is configured to identify this as a class change and to increment a class change counter (e.g., a memory location). Circuit 14 continues along number ray 30 until it reaches point 44, a class "O" point, and point 46, a class "X" point. Circuit 14 identifies this as another class change and again increments the class change counter. Circuit 14 continues in this manner until all or enough of subject data is read. The number of class changes represents the suitability of this characteristic for classification of subject 20. If a large number of class changes exist, then the characteristic is less suitable for classification of subject 20. If a small number of class changes exist, then the characteristic is more suitable for classification of subject 20.

At step 110, a further advantageous feature is shown. Circuit 14 is further configured to measure the interval between class changes in the arranged subject data, such as intervals 48 and 50 in FIG. 5. The greater the intervals between class changes, the more suitable the characteristic is for classification of subject 20. The lesser the intervals between class changes, the less suitable the characteristic is for classification of subject 20. As can be seen, either or both of the number of class changes and the size of the intervals may be used by circuit 14 to determine the suitability of the characteristic for classification of subject 20.

At step 112, circuit 14 is configured to generate a suitability value for each characteristic based on the number of class changes and/or the size of the intervals in the arranged subject data. The suitability value can then be used to compare the several characteristics of subject 20 relative to one another to determine which one is most suitable for classification. According to one exemplary equation, the suitability value is calculated as follows:

$$\sum_{i=1}^{n} \frac{1}{d_i + a}$$

wherein i=an index, n=the number of class changes, d(i)=the interval between class changes, and a is a constant used to vary the relative weight of the number of class changes versus the size of the intervals. This equation accommodates for the situation wherein d(i)=O, i.e., two subject data have the same characteristic value but different classes. The smaller this suitability value, the better the characteristic is for classifying the subjects. The larger this suitability value, the worse the characteristic is for classifying the subjects.

At step 114, one or more of the characteristics is selected as most suitable for classification of subject 20. Circuit 14 may be configured to perform this step automatically by simply comparing the suitability values, or this may be done by a user via user input device 18 after viewing the suitability values, number of class changes, and/or intervals between class changes on display 16. Once steps 102–114 are complete, circuit 14 is configured to automatically classify subjects, for example, during production, using the best characteristic or group of characteristics for classification purposes.

Figure 6:
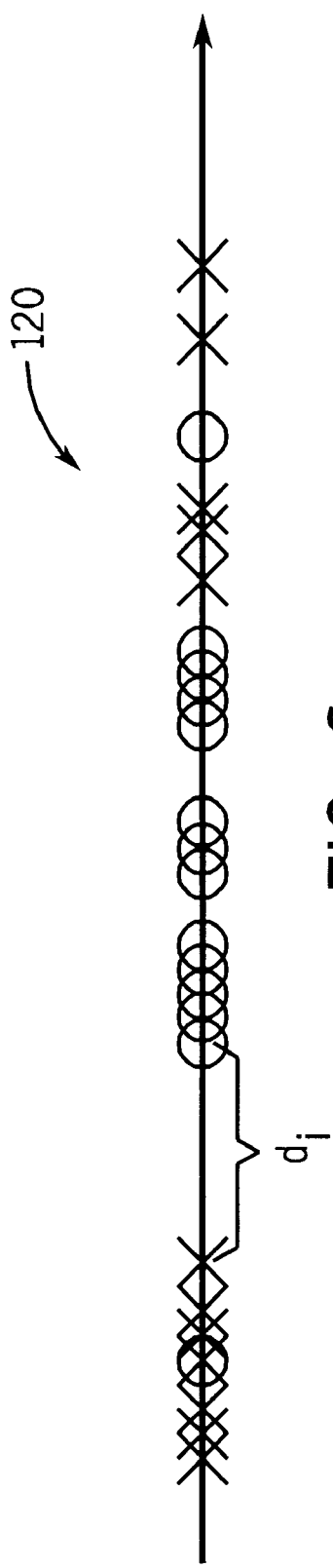
FIG. 6 is a number ray illustrating a characteristic relatively good for classification.
Figure 7:
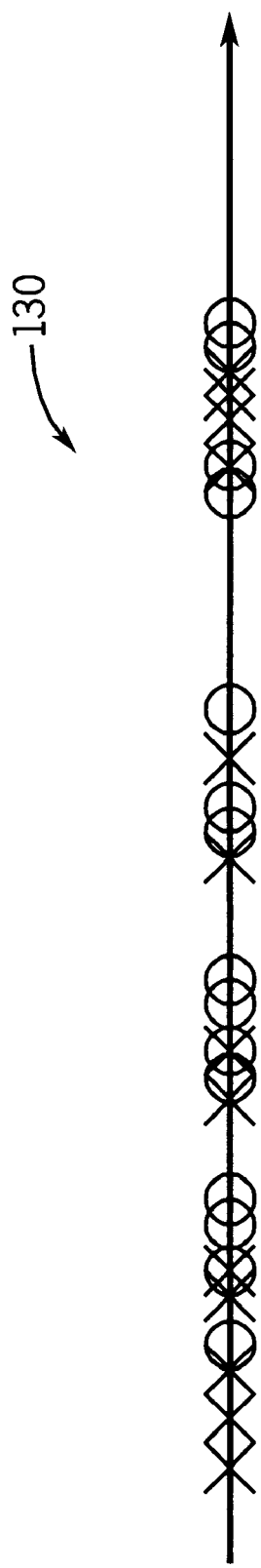
FIG. 7 is a number ray illustrating a characteristic relatively bad for classification.

FIGS. 6 and 7 are number rays 120 and 130 illustrating a first characteristic being relatively good for classification and a second characteristic 130 being relatively bad for classification, respectively. Number ray 120 includes only four class changes, each separated by at least a small interval. Number ray 130 includes approximately eleven class changes, most separated by a very small interval.

The measured characteristics of the subjects, as mentioned, can be any type of characteristic about the subjects which can be sensed or computed. In addition to those mentioned, circuit 14 may be configured to calculate further characteristics based on sensed characteristic data. For example, from a digital image of the subject, circuit 14 may calculate the mean value, variance, diameter, standard deviation, etc. of points within the digital image, each of which is a further characteristic of the subject which may be suitable for classification purposes. As another example, a microphone may receive a sound signal from the subject. One method of testing the quality of a tile is to tap the tile with a hammer and record the sound resonating therefrom. This sound signal is a characteristic of the subject, and data derived from the sound signal, such as, maximum amplitude, frequency, decay time, square root, absolute square, etc., are further characteristics of the subject which may be suitable for classification purposes. The system and method disclosed in FIGS. 3–5 above identifies which of these characteristics is best suited for classification of the tiles, for example, into "good" and "bad" parts.

While the exemplary embodiments have been illustrated and described, it should be understood that the embodiments disclosed herein are offered by way of example only. For example, the subject data, comprising characteristic data and class data, may be stored and arranged in various types of data structures and/or on various types of memories. Further, in addition to two-classification schemes (e.g., "good" parts and "bad" parts), subjects may be classified into three, four, or more classifications. The invention is not limited to a particular embodiment, but extends to various modifications that nevertheless fall within the scope of the appended claims.

What is claimed is:

1. A computer-readable medium having program code recorded thereon for execution in a computer for evaluating a characteristic for suitability in classification of subjects based on subject data, the subject data including characteristic data and class data, the program code performing the steps comprising:

arranging the subject data based on the characteristic data; and identifying the number of class changes from one class to another class in the arranged subject data, whereby the number of class changes represents the suitability of the characteristic for classification of the subjects.

2. The computer-readable medium of claim 1, the program code further performing the step of measuring the interval between class changes in the arranged subject data, whereby the interval between class changes represents the suitability of the characteristic for classification of the subjects.

3. The computer-readable medium of claim 2, the program code further performing the step of generating a suitability value equal to:

$$\sum_{i=1}^{n} \frac{1}{d_i + a}$$

wherein i=an index, n=the number of class changes, d(i)=the interval between class changes, and a is a constant.

4. The computer-readable medium of claim 1, the program code further performing the step of arranging the subject data along a number ray based on the characteristic data.

5. The computer-readable medium of claim 1, wherein the characteristic data includes a portion of a sound signal.

6. The computer-readable medium of claim 1, the program code further performing the step of classifying the subject data into one of the first class and the second class.

7. The computer-readable medium of claim 1, the subject data including second characteristic data and second class data, the program code further performing the steps of:

arranging the subject data based on the second characteristic data to create second arranged subject data; and identifying the number of class changes from one class to another class in the second arranged subject data, whereby the number of class changes in the second arranged subject data represents the suitability of the second characteristic for classification of the subjects.

8. The computer-readable medium of claim 7, the program code further performing the step of measuring the interval between class changes in the second arranged subject data, whereby the interval between class changes in the second arranged subject data represents the suitability of the second characteristic for classification of the subject.

9. The computer-readable medium of claim 7, program code further performing the step of selecting the one of the first and second characteristics having fewer class changes as the characteristic which most suitably classifies the subject.

10. The computer-readable medium of claim 1, the program code further performing the step of generating a suitability value based upon the number of class changes wherein the suitability value is representative of whether the characteristic data is suitable to sort the subjects.

11. The computer-readable medium of claim 1, the program code further performing the step of whether the characteristic data is suitable for classification.

12. A computer-readable medium having program code recorded thereon for execution in a computer for evaluating a characteristic for suitability in classification of subjects based on subject data, the subject data including characteristic data and class data, the program code performing the steps comprising:

arranging the subject data based on the characteristic data;

identifying consecutive subject data having a class change; and measuring the interval between the consecutive subject data, whereby the interval between class changes represents the suitability of the characteristic for classification of the subject.

13. The computer-readable medium of claim 12, the program code further performing the step of identifying the number of class changes in the arranged subject data, whereby the number of class changes represents the suitability of the characteristic for classification of the subjects.

14. The computer-readable medium of claim 13, the program code further performing the step of generating a suitability value equal to:

$$\sum_{i=1}^{n} \frac{1}{d_i + a}$$

wherein i=and index, n=the number of class changes, d(i)= the interval between class changes, and a is a constant.

15. The computer-readable medium of claim 12, wherein the characteristic data includes a diameter of the subject.

16. The computer-readable medium of claim 12, the program code further performing the step of classifying the subject data into one of the first class and the second class.

17. The computer-readable medium of claim 12, wherein the characteristic data includes image data.

18. The computer-readable medium of claim 12, the subject data including second characteristic data and second class data, the program code further performing the steps of:

arranging the subject data based on the second characteristic data to create second arranged subject data; and identifying the number of class changes from one class to another class in the second arranged subject data, whereby the number of class changes in the second arranged subject data represents the suitability of the second characteristic for classification of the subjects.

19. The computer-readable medium of claim 18, the program code further performing the step of measuring the interval between class changes in the second arranged subject data, whereby the interval between class changes represents the suitability of the second characteristic for classification of the subject.

20. The computer-readable medium of claim 19, the program code further performing the step of selecting the one of the first and second characteristics which most suitably classifies the subjects based on the number of class changes and the interval between class changes for each of the first and second characteristics.

21. The computer-readable medium of claim 12, wherein the subject data is arranged along a number ray, the consecutive subject data having neighboring positions on the number ray.

22. The computer-readable medium of claim 12, the program code further performing the step of generating a suitability value based upon the interval between the consecutive subject data wherein the suitability value is representative of whether the characteristic data is suitable to sort the subjects.

23. The computer-readable medium of claim 12, the program code further performing the step of indicating whether the characteristic data is suitable for classification.

24. A computer-readable medium having program code recorded thereon for execution in a computer for evaluating a characteristic for suitability in classification of subjects, comprising:

sensing means for acquiring characteristic data from a plurality of subjects;

classification means for classifying each subject with one of a first class and a second class; and means for arranging the subject data based on the characteristic data and identifying the number of class changes from one class to another class in the arranged subject data, whereby the number of class changes represents the suitability of the characteristic for classification of the subjects.

25. The computer-readable medium of claim 24, wherein the means for arranging and identifying includes a signal processing circuit.

26. The computer-readable medium of claim 24, further comprising means for measuring the interval between class changes in the arranged subject data, whereby the interval between class changes represents the suitability of the characteristic for classification of the subjects.

27. The computer-readable medium of claim 24, further comprising means for generating a suitability value equal to:

$$\sum_{i=1}^{n} \frac{1}{d_i + a}$$

wherein i=an index, n=the number of class changes, d(i)=the interval between class changes, and a is a constant.

28. The computer-readable medium of claim 24, further comprising means for arranging the subject data along a number ray based on the characteristic data.

29. The computer-readable medium of claim 24, further comprising:

sensing means for acquiring second characteristic data from the plurality of subjects; and means for arranging the subject data based on the second characteristic data to create second arranged subject data and for identifying the number of class changes from one class to another class in the second arranged subject data, whereby the number of class changes in the second arranged subject data represents the suitability of the second characteristic for classification of the subjects.

30. The computer-readable medium of claim 29, further comprising means for measuring the interval between class changes in the second arranged subject data, whereby the interval between class changes represents the suitability of the second characteristic for classification of the subject.

31. The computer-readable medium of claim 30, further comprising means for selecting the one of the first and second characteristics which most suitably classifies the subjects.

32. The computer-readable medium of claim 24, further comprising means for generating a suitability value based upon the number of class changes from one class to another class in the arranged subject data, wherein the suitability value is representative of whether the characteristic data is suitable to sort the subjects.

33. The computer-readable medium of claim 24, further comprising means for indicating whether the characteristic data is suitable for classification.

\* \* \* \* \*